United States Patent [19]
Lampe-Onnerud

[11] Patent Number: 6,042,805
[45] Date of Patent: Mar. 28, 2000

[54] METHOD FOR SYNTHESIZING AN ESSENTIALLY $V_2O_5$-FREE VANADIUM OXIDE

[75] Inventor: Christina Lampe-Onnerud, Uppsala, Sweden

[73] Assignee: Danionics A/S, Odense S, Denmark

[21] Appl. No.: 08/849,633

[22] PCT Filed: Nov. 29, 1995

[86] PCT No.: PCT/DK95/00480

§ 371 Date: Nov. 7, 1997

§ 102(e) Date: Nov. 7, 1997

[87] PCT Pub. No.: WO96/17229

PCT Pub. Date: Jun. 6, 1996

[30] Foreign Application Priority Data

Nov. 29, 1994 [DK] Denmark ................................. 1365/94

[51] Int. Cl.⁷ ............................ C01B 13/14; C01G 13/14
[52] U.S. Cl. ............................................ 423/592; 423/593
[58] Field of Search ..................... 423/592, 593

[56] References Cited

U.S. PATENT DOCUMENTS

| | | | |
|---|---|---|---|
| 4,035,476 | 7/1977 | Ilmaier | 423/592 |
| 4,486,400 | 12/1984 | Riley | 423/592 |
| 4,965,150 | 10/1990 | Dahn et al. | 429/194 |
| 5,443,809 | 8/1995 | Olsen | 423/592 |
| 5,545,496 | 8/1996 | Chang et al. | 429/218 |

FOREIGN PATENT DOCUMENTS

| | | |
|---|---|---|
| 62-197317 | 9/1987 | Japan . |
| 1-320228 | 12/1989 | Japan . |

OTHER PUBLICATIONS

K. C. Khulbe et al., "Thermal Decomposition of Ammonium Metavandate", Can. J. Chem., 53(1975)2917–2921.

U. Von Sacken et al., "TGA/MS Studies of the Termal Decomposition of $NH_4VO_3$", J. Power Sources, 26(1989)461–465.

J. Trau, "Preparation of the Vanadium Oxide $V_6O_3$", J. Thermal Analysis, 16(1979)201–204.

M. E. Brown et al., "The Terminal Decomposition of Ammonium Metavanadate II", J. Thermal Analysis, 6(1974)529–514.

Yankelvich et al., Ukr. Khim. Zlh, 42(1976)659–660.

*Primary Examiner*—Gary P. Straub
*Assistant Examiner*—Cam N. Nguyen
*Attorney, Agent, or Firm*—Darby & Darby

[57] ABSTRACT

A new method for synthesising an essentially $V_2O_5$-free vanadium oxide having a mean vanadium oxidation state of at least +4 but lower than +5 from $NH_4VO_3$ is disclosed. By this method $NH_4VO_3$ is heated to a reaction temperature sufficient for thermal decomposition of $NH_4VO_3$, and at said reaction temperature, the pressure is kept on at least 0.5 MPa. The method enables production of single-phase $V_6O_{13}$, single-phase $VO_2$ as well as any mixture thereof in a remarkably simple manner, as it primarily involves careful control of temperature and pressure conditions. The synthesis method of the invention can thus be easily scaled up to any industrial requirement.

17 Claims, 3 Drawing Sheets

METHOD FOR SYNTHESIZING AN ESSENTIALLY V₂O₅-FREE VANADIUM OXIDE

The present invention is concerned with a method for synthesising an essentially $V_2O_5$-free vanadium oxide having a mean vanadium oxidation state of at least +4 but lower than +5 from $NH_4VO_3$, said vanadium oxide preferably consisting essentially of $V_6O_{13}$, $VO_2$ or any mixture thereof.

Vanadium oxides having a mean vanadium oxidation state between +5 and +4 have attracted much attention as potential active cathode materials in secondary lithium batteries. These materials are generally prepared from $NH_4VO_3$ (ammonium metavanadate).

Single phase $V_2O_5$ is readily synthesised by heating $NH_4VO_3$ in air (see e.g. K. C. Khulbe and R. S. Mann, Can. Jour. Chem, Vol. 53 (1975), p. 2917). The lower oxides, especially $V_6O_{13}$ (mean oxidation state +4⅓) and $VO_2$ (mean oxidation state +4), are more difficult to obtain as single-phase materials (see e.g. U. von Sacken and J. R. Dahn, J. Power Sources, Vol. 26 (1989), p. 461).

In J. Thermal Anal., Vol. 16 (1979) 659 Trau discusses the problem of obtaining phase-pure $V_6O_{13}$ under thermal decomposition of $NH_4VO_3$ without using added reduction reactants. The use of $SO_2$ as a reducing agent for $V_2O_5$ to form $V_6O_{13}$ is technically very complicated; it is difficult to stop the reduction and obtain a homogeneous single-phase $V_6O_{13}$ powder. Trau instead suggests thermal decomposition in a stream of pure nitrogen gas with slow heating to 500–550° C., and a post-treatment with boiling $NaOH_{(aq)}$ to remove $V_2O_5$ as proposed by Yankelvich et al. in Ukr. Khim. Zh., Vol. 42 (1976) 659.

Brown et al. reports in J. Thermal Anal, Vol. 6 (1974) 529 the formation of lower oxides using an $NH_3$ atmosphere when decomposing $NH_4VO_3$.

U.S. Pat. No. 4,486,400 describes a process for preparing stoichiometric $V_6O_{13}$ by thermal decomposing ammonium metavanadate in a nitrogen atmosphere to produce nonstoichiometric $V_6O_{13}$, followed by heating the obtained nonstoichiometric $V_6O_{13}$ in an $CO/CO_2$-atmosphere having a composition giving an oxygen partial pressure equal to the oxygen partial pressure over stoichiometric $V_6O_{13}$ to form stoichiometric $V_6O_{13}$.

U.S. Pat. No. 4,035,476 describes the preparation of agglomerated vanadium oxides of the formula $V_2O_x$, wherein x is between 3.8 and 4.6, by thermal decomposition of ammonium polyvanadate ($(NH_4)_2.O.3V_2O_5.nH_2O$) at a temperature of 600 to 900° C. and permitting the solid decomposition products and reducing agents to react.

JP 62-197317 describes the production of $V_6O_{13}$ or $V_2O_4$ by introducing $NH_4VO_3$, optionally mixed with $\leq 15\%$ $V_2O_5$, into a reaction vessel, heating to a temperature of 380 to 750° C. at a rate of 0.5 to 30 K/min, keeping this temperature for 30 min to 3 hours and keeping the pressure at about 3 atm or below by means of a pressure-control valve.

Impurities in the cathode material generally have a negative influence on the overall battery performance, especially the battery capacity declines faster in the presence of impurities. In particular it is has been shown that even small amounts of other $VO_x$ phases, especially $V_2O_5$, has a negative influence on the lithium intercalating properties of $V_6O_{13}$ and $VO_2$.

Thus, although several methods for the manufacturing of lower vanadium oxides are known there still exists a need for an improved synthesis method for the preparation of lower vanadium oxides of high purity, i.e. essentially free of $V_2O_5$.

Accordingly, it is an object of the invention to provide a method for synthesising an essentially $V_2O_5$-free vanadium oxide having a mean vanadium oxidation state of at least +4 but lower than +5 from $NH_4VO_3$, said vanadium oxide preferably consisting essentially of $V_6O_{13}$, $VO_2$ or any mixture thereof.

It has been shown that this object is accomplished by a method described above, in which $NH_4VO_3$ is heated to a reaction temperature sufficient for thermal decomposition of $NH_4VO_3$, and in which, at said reaction temperature, the pressure is kept on at least 0.5 MPa.

It is a further advantage of the method according to the invention that it does not involve any time-consuming and thus costly separation processes. Nor does it involve the use of added reducing agents in order to obtain the desired purity, but only carefully controlled temperature and pressure conditions. The synthesis method of the invention can thus be easily scaled up to any industrial requirement.

The formation of vanadium oxides from $NH_4VO_3$ involves two processes: the decomposition of ammonium metavanadate, followed by the reduction of the formed vanadium species. These processes can proceed simultaneously and the reaction routes are often quite complicated.

The formation of $V_6O_{13}$ from $NH_4VO_3$ presumably proceeds through a reduction of vanadium from oxidation state +5 resulting in formation of $N_2$ and the lower oxide ($V_6O_{13}$) having a mean oxidation state of +4⅓, according to the following total reaction scheme:

$$18NH_4VO_3 \rightarrow 3V_6O_{13}+14NH_3+15H_2O+2N_2 \qquad (1)$$

It is very likely that the same type of reaction route is followed when $VO_2$ is formed, thus giving rise to the following total reaction scheme:

$$18NH_4VO_3+18VO_2+12NH_3+18H_2O+3N_2 \qquad (2)$$

It has surprisingly been shown that the structure of the vanadium oxide produced by carrying out the process according to the invention can be controlled in a remarkably simple manner by varying the pressure under which the product is synthesised:

When the pressure is kept within the range of 0.5 to 2.5 MPa, preferably 1.0 to 2.0 MPa, e.g. about 1.5 MPa, the product obtained is single phase $V_6O_{13}$. At pressures below 0.5 MPa, $V_2O_5$ is produced together with $V_6O_{13}$. At pressures above 2.5 MPa $VO_2$ is formed together with $V_6O_{13}$. When the desired product is single phase $VO_2$ the pressure should be at least 3.5 MPa, preferably in the range of 3.5 MPa to 7.0 MPa.

In the present context the expression "single phase" is used to designate vanadium oxides which according to X-ray analysis contain virtually no other crystal phases (less than the detectability limit for XRD of approximately 2%) than the predominant one.

The reaction temperature should be selected so that efficient decomposition of $NH_4VO_3$ occurs. Accordingly, $NH_4VO_3$ is preferably heated to a temperature of at least 250° C., more preferably to a temperature in the range of 300 to 800° C., even more preferably 425 to 550° C.

The applied heating rate is advantageously lower than 2 K/min. Preferably the heating rate is in the range of 0.1 to 2 K/min, more preferably in the range of 0.5 to 1 K/min.

The period at which the $NH_4VO_3$ is kept at the reaction temperature may vary according to the desired end product. For synthesis of single phase $V_6O_{13}$ a reaction period of 10 s to 24 h is preferably employed, whereas for synthesis of single phase $VO_2$ a reaction period of 2 h to 5 d is preferably employed.

The heating is preferably performed under such conditions that the solid decomposition product and the produced decomposition gas, including $NH_3$, from the $NH_4VO_3$ starting material are permitted to react.

In a preferred embodiment such conditions are ensured by heating the $NH_4VO_3$ in a closed reaction chamber, preferably equipped with means for controlling the pressure in the chamber, such as an adjustable relief valve.

In this embodiment the reaction chamber is preferably filled with an amount of $NH_4VO_3$ powder corresponding to ½ to 9/10 of the reaction chamber volume, so that the produced decomposition gas efficiently displaces the air in the reaction chamber.

The invention will be further described with reference to examples and the drawing in which.

Figure 1:
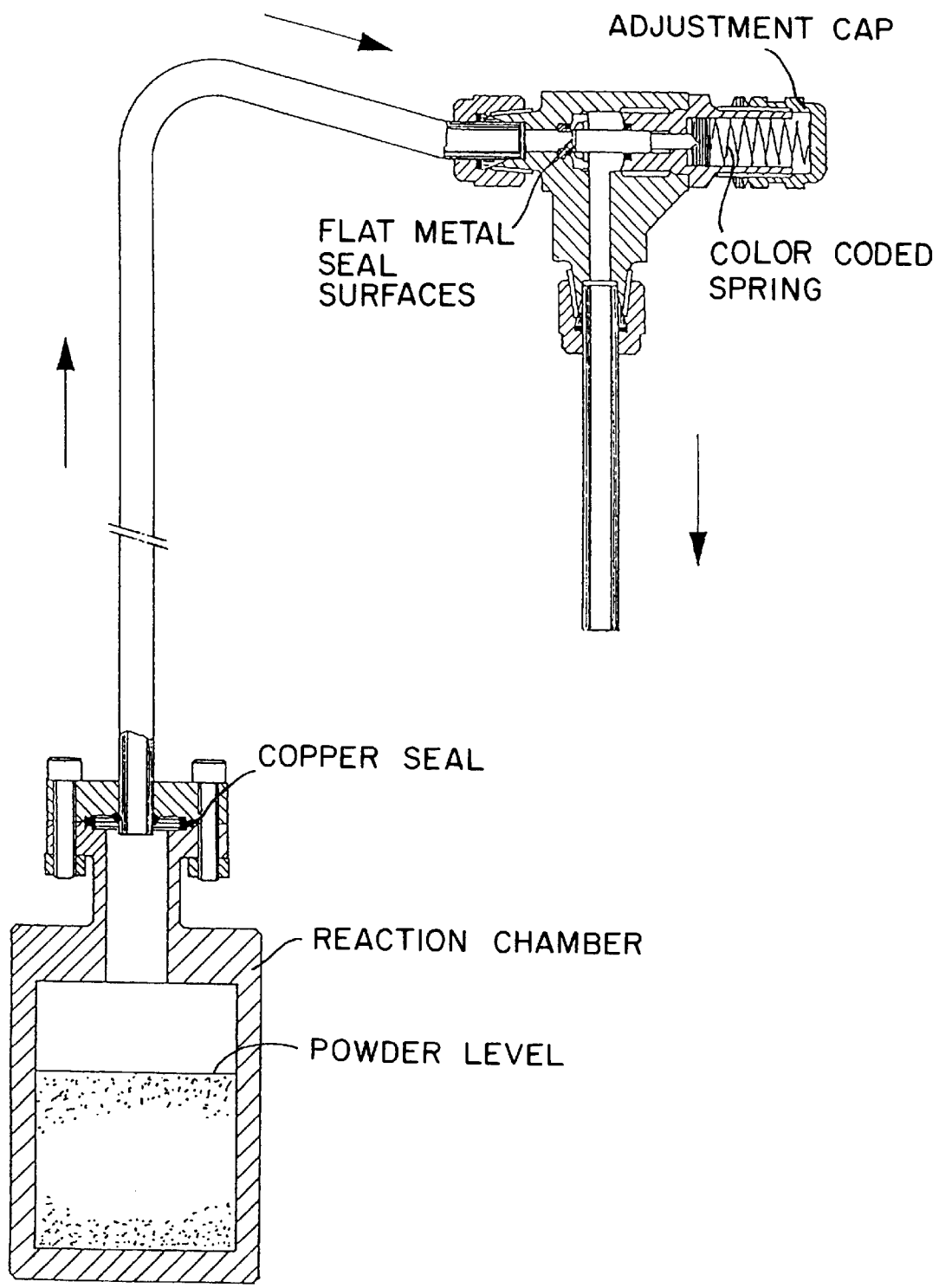
FIG. 1 shows an apparatus for performing the process according to the invention.

The reaction chamber used for the synthesis of the vanadium oxide according to the invention is shown in FIG. 1. The chamber, tubes and all welds are made of stainless acid resistant steel. The chamber could only be opened and closed at the stainless steel high-vacuum coupling (CF 16, VACUTECH), which was sealed with replaceable copper gaskets, six steel screws (Unbraco M4) and 8 mm silver steel nuts.

The experimental set-up shown in FIG. 1 was used for the synthesis of $V_6O_{13}$ (Example 1). The desired overpressure was regulated with a relief valve (NUPRO R3A) fitted with viton standard seals and pre-set with exchangeable springs (NUPRO, blue K1-A). Prior to an experimental run all parts were cleaned at 60° C. in a basic detergent (Labkemi RBS 25) for 60 minutes in an ultra-sound bath and thereafter rinsed in water and ethanol.

A slightly different experimental set-up was used for the $VO_2$ synthesis(Example 2). The pressure was controlled with a blanking flange (Balzer DN 16 CF) mounted directly on the reaction chamber.

The final products produced according to the following examples 1 and 2 were characterised in terms their phase-purity and degree of crystallinity by X-ray diffraction (XRD) using $CuK\alpha_1$ radiation and a STOE & CIE GmbH STADI powder diffractometer equipped with a curved position sensitive detector.

The mean oxidation state for the vanadium of the final products was determined by titration. The $V_6O_{13}$ and $VO_2$ products were dissolved in 0.5M $H_2SO_4$ and 3M HCl, respectively. The dissolved samples were first titrated up to V(+5) with a standard $Ce(SO_4)_2 \cdot 4H_2O$ (Merck, 0.10M) solution, followed by titration down to V(+4) with a solution of $FeSO_4 \cdot 7H_2O$ (Merck, p.a.), controlled against standard $KMnO_4$ (Merck, 0.02M). Three subsequent titrations were performed.

Grain-size distribution and morphology of the final products were analysed by scanning electron microscopy (SEM) on samples pressed onto a carbon film using a Zeiss DSM 960A scanning electron microscope.

EXAMPLE 1

Synthesis of single-phase $V_6O_{13}$.

Using the apparatus shown in FIG. 1, single-phase $V_6O_{13}$ was synthesised in the following manner:

$NH_4VO_3$ powder (Gesellschaft für Electrometallurgie, MBH, 99.9%) was introduced in the chamber (having a volume of 940 $cm^3$) in an amount corresponding to ⅔ of the chamber volume. Then the reaction chamber was sealed, connected to the relief valve arrangement, placed in a temperature controlled furnace and heated to a temperature of 500° C. at a heating rate of 0.5 K/min. The relief valve was adjusted so as to control the pressure in the reaction chamber to 1.5 MPa. The temperature was kept at 500° C. for 1 minut. The chamber was then allowed to cool to room temperature in an airstream and dismantled. The obtained dark (bluish-black) powder had sintered into agglomerates and had to be scraped out of the chamber.

Figure 2:
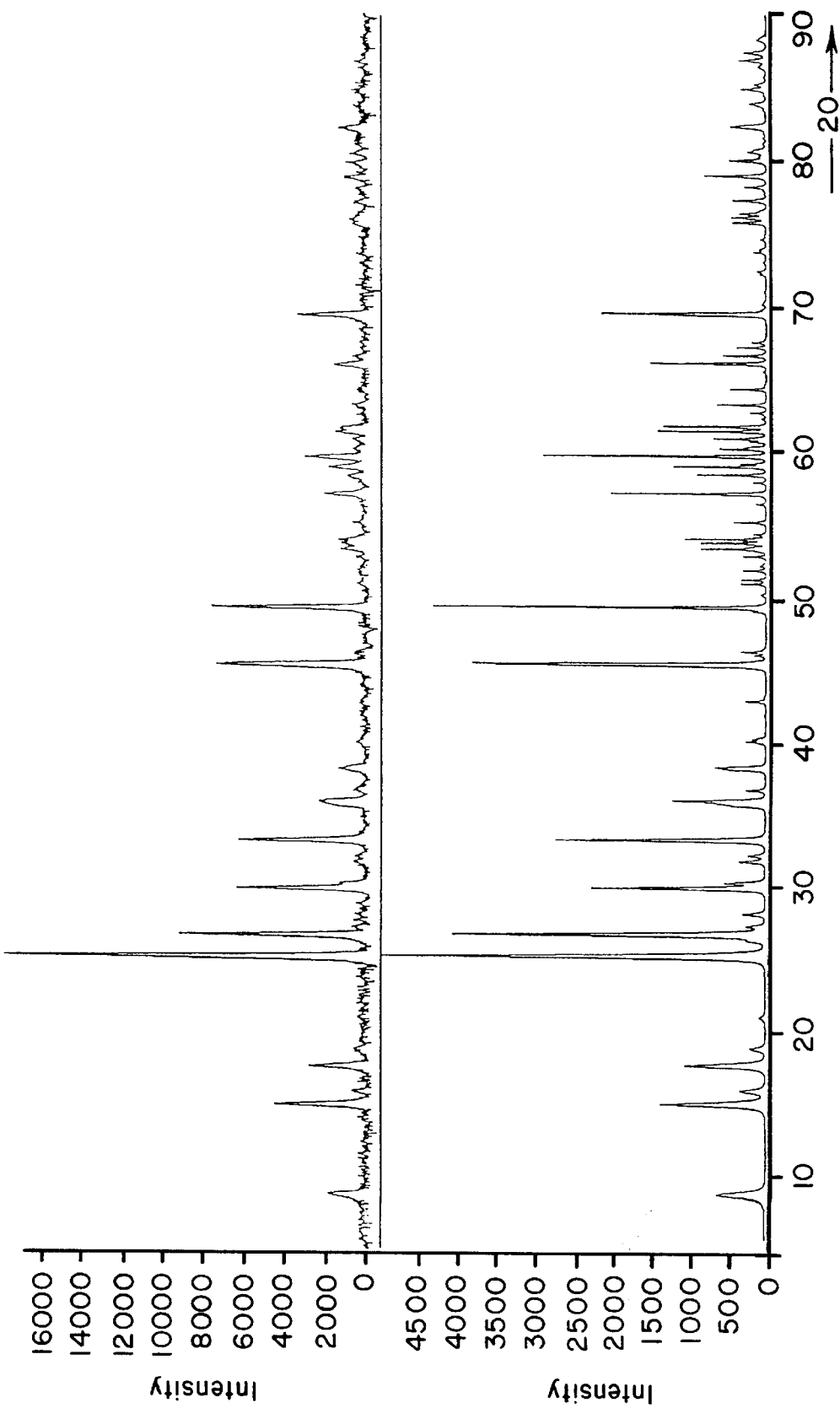
FIG. 2 shows a real (upper curve) and a simulated (lower curve) X-ray diffractogram of a single-phase $V_6O_{13}$ sample produced according to an embodiment of the invention.

The phase purity of the resulting product was checked by X-ray diffraction (XRD). In FIG. 2 is shown the X-ray diffractogram for the obtained $V_6O_{13}$ product in the upper curve, while the lower curve is a corresponding simulated X-ray diffractogram. XRD showed that the $V_6O_{13}$ obtained was phase-pure and highly crystalline.

A mean vanadium oxidation state of 4.30 (±0.01) was determined by titration.

SEM studies of the morphology showed needle-like crystals propagating in the direction of the short b-axis in the monoclinic $V_6O_{13}$ unit cell. However, very different lengths were observed; from 5 to 50 $\mu$m for adjacent crystals. The crystals compacted together on sintering to form spherical powder grains with a maximum dimension of up to 300 $\mu$m.

EXAMPLE 2

Synthesis of single-phase $VO_2$.

The reaction chamber shown in FIG. 1 was slightly modified for the $VO_2$ synthesis, the flange being closed by a plate.

$NH_4VO_3$ powder (Gesellschaft für Electrometallurgie, 99.9%) was introduced in the chamber in an amount corresponding to 9/10 of the chamber volume. Then the chamber was heated in the same manner and at the same rate as in Example 1 to a temperature of 500° C. and annealed at that temperature for 3 days. The obtained $VO_2$ powder (greyish-black) consisted of very fine grains and could easily be removed from the reaction chamber.

Figure 3:
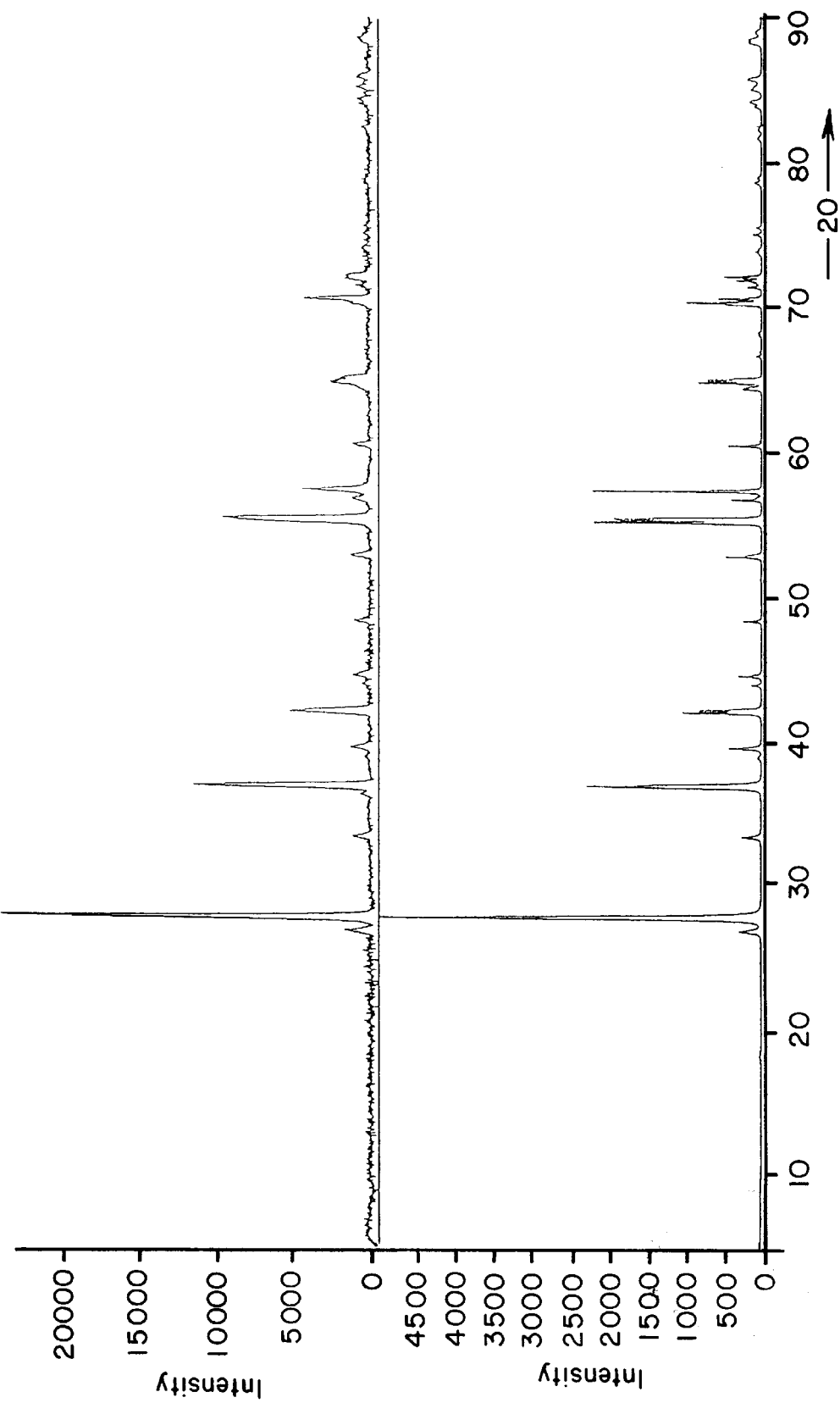
FIG. 3 shows a real (upper curve) and a simulated (lower curve) X-ray diffractogram of a single-phase $VO_2$ sample produced according to another embodiment of the invention.

The phase purity of the resulting product was checked by XRD. In FIG. 3 is shown the X-ray diffractogram for the obtained $VO_2$ product in the upper curve, while the lower curve is a corresponding simulated X-ray diffractogram. XRD showed that the $VO_2$ formed was phase-pure and crystalline.

A mean vanadium oxidation state of 4.00 (±0.01) was determined by titration.

SEM revealed bulky crystals (5 to 20 $\mu$m) in a quite homogeneous and non-sintered powder.

In the following Table I the results from the analysis of the products synthesised in Examples I and II are presented.

TABLE I

|  | Example | |
| --- | --- | --- |
|  | I | II |
| Compound | $V_6O_{13}$ | $VO_2$ |
| Crystal Structure | C 2/m | P $2_1$/m |
|  | a = 11.911(3)Å | a = 5.750(1)Å |
|  | b = 3.674(1)Å | b = 4.5289(8)Å |
|  | c = 10.130(2)Å | c = 5.381(1)Å |
|  | β = 100.90(1)° | β = 122.61(1)° |
| XRD | Phase-pure $V_6O_{13}$ | Phase-pure $VO_2$ |
| Mean oxidation state for vanadium | +4.0 (±0.01) | +4.00 (±0.01) |
| SEM | Needles, sintered to form spherical agglomerates | Bulky powder, non-sintered |

I claim:

1. A method for synthesizing an essentially $V_2O_5$-free vanadium oxide having a mean vanadium oxidation state of at least +4 but lower than +5 from $NH_4VO_3$ in one step, said method comprising heating $NH_4VO_3$ to effect thermal decomposition thereof while maintaining an autogenous pressure of at least 0.5 MPa.

2. A method according to claim 1 for synthesizing single phase $V_6O_{13}$ from $NH_4VO_3$, wherein the pressure is kept within the range of 0.5 to 2.5 MPa.

3. A method according to claim 2 wherein the pressure ranges from 1.0 to 2.0 Mpa.

4. A method according to claim 1 for synthesizing a vanadium oxide consisting of a mixture of $V_6O_{13}$ and $VO_2$ from $NH_4VO_3$, wherein the pressure is kept within the range of 2.5 to 3.5 MPa during the decomposition.

5. A method according to claim 1 for synthesizing single phase $VO_2$ from $NH_4V_3$, wherein the pressure is greater than 3.5 MPa during the decomposition.

6. A method according to claim 5 wherein the pressure ranges from 3.5 to 7.0 MPa.

7. A method according to claim 1, wherein the $NH_4VO_3$ is heated to a temperature in the range of 250 to 800° C.

8. A method according to claim 7, wherein the temperature ranges from 300 to 800° C.

9. A method according to claim 8, wherein the temperature ranges from 425 to 550° C.

10. A method according to claim 1, wherein the $NH_4VO_3$ is heated from ambient temperature to reaction temperature at a rate in the range of 0.1 to 2 K/min.

11. A method according to claim 10, wherein the rate ranges from 0.5 to 1 K/min.

12. A method according to claim 1, wherein the $NH_4VO_3$ is kept at the reaction temperature for a period of from 10 seconds to 24 hours for synthesis of single phase $V_6O_{13}$.

13. A method according to claim 1, wherein the $NH_4VO_3$ is kept at the reaction temperature for a period of from 2 hours to 5 days for synthesis of single-phase $VO_2$.

14. A method according to claim 13, wherein the $NH_4VO_3$ is heated in a closed reaction chamber equipped with means for controlling the pressure in the chamber.

15. A method according to claim 14, wherein said means for controlling the pressure in the closed reaction chamber is an adjustable relief valve.

16. A method according to claim 1, wherein heating is performed so that the solid decomposition product and the produced decomposition gas from the $NH_4VO_3$ starting material are permitted to react.

17. A method according to claim 16, wherein the volume of $NH_4VO_3$ powder in said reaction chamber ranges from ½ to 9/10 of the reaction chamber volume.

* * * * *